United States Patent
Cunha et al.

(10) Patent No.: US 10,451,281 B2
(45) Date of Patent: Oct. 22, 2019

(54) LOW LUMP MASS COMBUSTOR WALL WITH QUENCH APERTURE(S)

(71) Applicant: United Technologies Corporation, Hartford, CT (US)

(72) Inventors: Frank J. Cunha, Avon, CT (US); Stanislav Kostka, Middletown, CT (US)

(73) Assignee: United Technologies Corporation, Farmington, CT (US)

( * ) Notice: Subject to any disclaimer, the term of this patent is extended or adjusted under 35 U.S.C. 154(b) by 891 days.

(21) Appl. No.: 14/932,556

(22) Filed: Nov. 4, 2015

(65) Prior Publication Data

US 2016/0123594 A1 May 5, 2016

Related U.S. Application Data

(60) Provisional application No. 62/074,911, filed on Nov. 4, 2014.

(51) Int. Cl.
*F23R 3/06* (2006.01)
*F23R 3/00* (2006.01)
*F02C 7/18* (2006.01)

(52) U.S. Cl.
CPC ............. *F23R 3/06* (2013.01); *F02C 7/18* (2013.01); *F23R 3/002* (2013.01); *F23R 3/005* (2013.01)

(58) Field of Classification Search
CPC .. F23R 3/002; F23R 3/005; F23R 3/04; F23R 3/045; F23R 3/06; F23R 3/08; F23R 3/10; F23R 3/60; F02C 7/18; F05D 2260/221; F05D 2260/2212; F05D 2260/2214; F05D 2260/22141; F23C 7/00; F23C 2203/30; F23G 2203/207; F23L 9/04

See application file for complete search history.

(56) References Cited

U.S. PATENT DOCUMENTS

| | | | | |
|---|---|---|---|---|
| 3,303,645 A * | 2/1967 | Ishibashi | ............. | F23R 3/045 60/755 |
| 3,593,518 A * | 7/1971 | Gerrard | .............. | F23R 3/04 431/352 |
| 4,622,821 A * | 11/1986 | Madden | .............. | F23R 3/06 60/755 |
| 6,145,319 A * | 11/2000 | Burns | .............. | F23R 3/002 60/754 |
| 6,240,731 B1 | 6/2001 | Hoke | | |
| 6,606,861 B2 | 8/2003 | Snyder | | |
| 6,810,673 B2 | 11/2004 | Snyder | | |

(Continued)

FOREIGN PATENT DOCUMENTS

GB      894042 A *   4/1962   .............. F23C 99/00

OTHER PUBLICATIONS

EP search report for EP15193025.2 dated Mar. 4, 2016.

*Primary Examiner* — Jason H Duger
(74) *Attorney, Agent, or Firm* — O'Shea Getz P.C.

(57) ABSTRACT

An assembly is provided for a turbine engine. This turbine engine assembly includes a combustor wall including a first layer vertically connected with a second layer. A first portion of the first layer overlaps and is vertically spaced from the second layer by a cavity. A second portion of the first layer is substantially vertically inline with an adjacent portion of the second layer. The second portion of the first layer at least partially forms a quench aperture vertically through the combustor wall.

13 Claims, 7 Drawing Sheets

(56) References Cited

U.S. PATENT DOCUMENTS

| | | |
|---|---|---|
| 7,614,235 B2 | 11/2009 | Burd |
| 7,954,325 B2 | 6/2011 | Burd |
| 8,056,342 B2 | 11/2011 | Shelley |
| 8,171,740 B2 * | 5/2012 | Bronson ................. F23R 3/045 60/804 |
| 8,432,440 B2 * | 4/2013 | Krull ....................... F23N 5/082 348/83 |
| 8,443,610 B2 | 5/2013 | Hoke |
| 8,479,521 B2 | 7/2013 | Hoke |
| 8,683,812 B2 | 4/2014 | Bertolotti |
| 8,739,546 B2 | 6/2014 | Snyder |
| 8,789,374 B2 | 7/2014 | Hoke |
| 9,062,884 B2 * | 6/2015 | Rudrapatna ............. F23R 3/045 |
| 9,377,200 B2 * | 6/2016 | Sandelis .................... F23R 3/06 |
| 9,494,174 B2 * | 11/2016 | Pastecki .................. F15D 1/025 |
| 9,897,318 B2 * | 2/2018 | Vedhagiri ............... F23R 3/002 |
| 2006/0117755 A1 * | 6/2006 | Spooner ................. F23R 3/002 60/752 |
| 2013/0031904 A1 | 2/2013 | Garry |
| 2013/0298564 A1 * | 11/2013 | Agarwal ................... F23R 3/06 60/772 |
| 2014/0033723 A1 | 2/2014 | Doerr et al. |
| 2014/0190171 A1 | 7/2014 | Critchley et al. |
| 2015/0059344 A1 | 3/2015 | Sandelis |

* cited by examiner

LOW LUMP MASS COMBUSTOR WALL WITH QUENCH APERTURE(S)

This application claims priority to U.S. Patent Appln. No. 62/074,911 filed Nov. 4, 2014.

BACKGROUND OF THE INVENTION

1. Technical Field

This disclosure relates generally to a turbine engine and, more particularly, to a combustor for a turbine engine.

2. Background Information

A floating wall combustor for a turbine engine typically includes a bulkhead, an inner combustor wall and an outer combustor wall. The bulkhead extends radially between the inner and the outer combustor walls. Each combustor wall may include a shell and a heat shield, which heat shield forms a respective radial peripheral side of a combustion chamber. Cooling cavities extend radially between and separate the heat shield and the shell. These cooling cavities may fluidly couple impingement apertures in the shell with effusion apertures in the heat shield.

Each combustor wall may also include a plurality of quench aperture grommets located between the shell and the heat shield. Each of the quench aperture grommets forms a quench aperture radially through the respective combustor wall. The quench aperture grommets as well as adjacent portions of the heat shield are typically subject to relatively high temperatures during turbine engine operation due to the relatively large lump material mass associated therewith, which can induce relatively high thermal stresses within the grommets and the heat shield.

There is a need in the art for an improved turbine engine combustor.

SUMMARY OF THE DISCLOSURE

According to an aspect of the invention, an assembly is provided for a turbine engine. This turbine engine assembly includes a combustor wall including a first layer vertically connected with a second layer. A first portion of the first layer overlaps and is vertically spaced from the second layer by a cavity. A second portion of the first layer is substantially vertically inline with an adjacent portion of the second layer. The second portion of the first layer at least partially forms a quench aperture vertically through the combustor wall.

According to another aspect of the invention, a combustor wall is provided for a turbine engine. This combustor wall includes a first layer vertically attached with a second layer. A first portion of the first layer overlaps and is vertically offset from the second layer. A second portion of the first layer extends vertically at least partially into an aperture in the second layer. The second portion of the first layer at least partially forms a quench aperture vertically through the combustor wall.

According to still another aspect of the invention, another combustor wall is provided for a turbine engine. This combustor wall includes a first layer vertically connected with a second layer. A cooling cavity extends vertically between the first layer and the second layer. The first layer substantially completely defines a quench aperture vertically through the combustor wall. The first layer has a substantially uniform thickness.

The first layer may substantially completely define the quench aperture vertically through the combustor wall.

The second layer may have a substantially uniform thickness.

The first layer may include or be configured as a shell. The second layer may include or be configured as a heat shield. Alternatively, the first layer may include or be configured as a heat shield. The second layer may include or be configured as a shell.

The second portion may substantially completely define the quench aperture vertically through the combustor wall.

A thickness of the first portion may be substantially equal to a thickness of the second portion.

The second portion may extend at least partially vertically into an aperture in the second layer.

The second portion may form a vertical indentation in the first layer.

At least the second portion of the first layer and the second layer may be configured to form a side periphery of a combustion chamber.

At least a portion of the first layer at the side periphery may be coated with a thermal barrier coating. In addition or alternatively, at least a portion of the second layer at the side periphery may be coated with a thermal barrier coating.

The second portion may have a curved geometry.

The second portion may include one or more cooling holes.

The second portion may include one or more stiffening features.

The second portion may include one or more protrusions.

The combustor wall may extend circumferentially about and axially along a centerline. The first portion may be located axially forward of the second portion. Alternatively, the first portion may be located axially aft of the second portion.

A third portion of the first layer may overlap and be vertically spaced from the second layer by the cavity or another cavity. The second portion may be between the first and the third portions.

The foregoing features and the operation of the invention will become more apparent in light of the following description and the accompanying drawings.

DETAILED DESCRIPTION OF THE INVENTION

Figure 1:
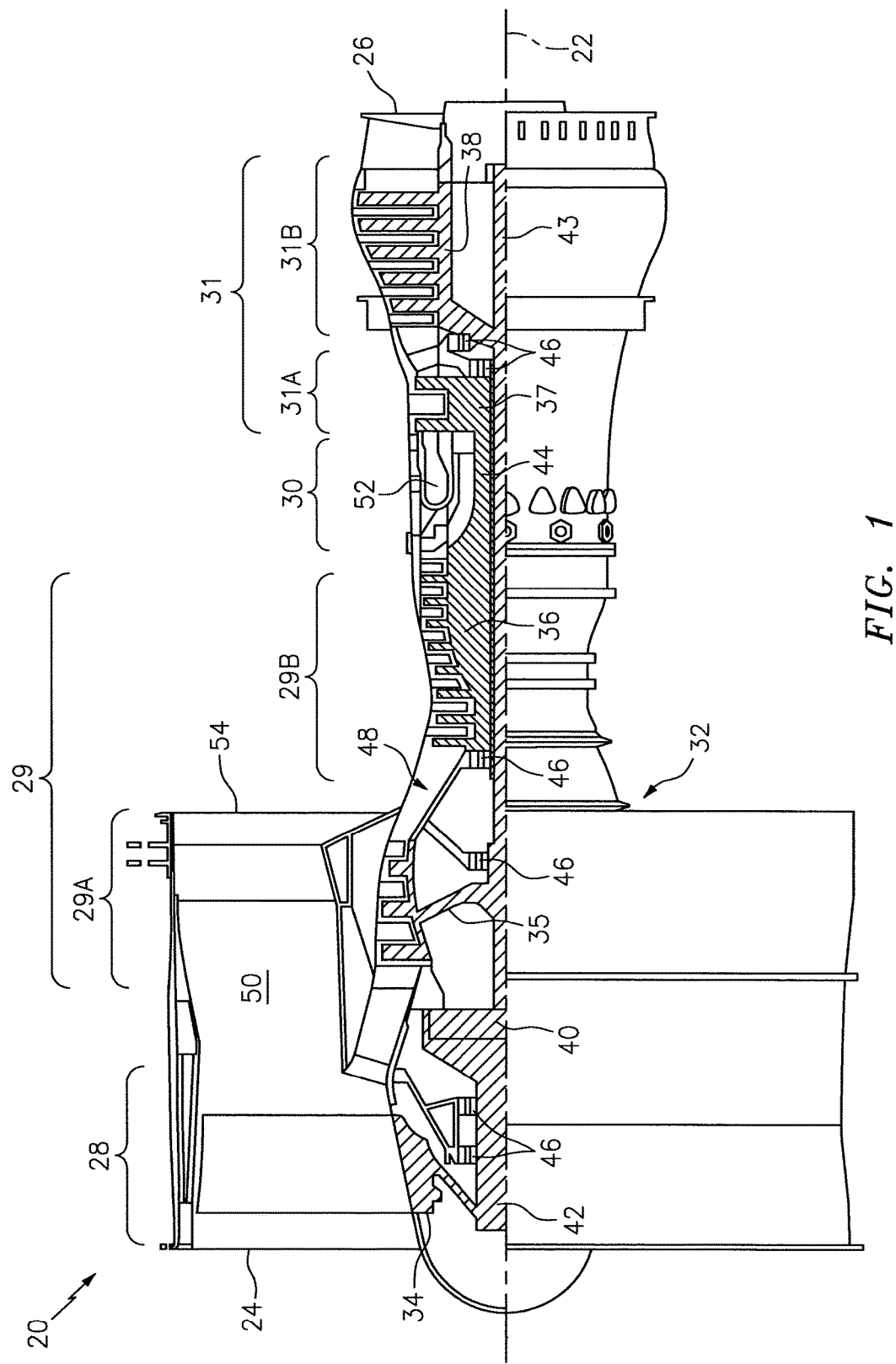
FIG. 1 is a side cutaway illustration of a geared turbine engine.

FIG. 1 is a side cutaway illustration of a geared turbine engine 20. This turbine engine 20 extends along an axial centerline 22 between an upstream airflow inlet 24 and a downstream airflow exhaust 26. The turbine engine 20 includes a fan section 28, a compressor section 29, a combustor section 30 and a turbine section 31. The compressor section 29 includes a low pressure compressor (LPC) section 29A and a high pressure compressor (HPC)

section 29B. The turbine section 31 includes a high pressure turbine (HPT) section 31A and a low pressure turbine (LPT) section 31B.

The engine sections 28-31 are arranged sequentially along the centerline 22 within an engine housing 32. Each of the engine sections 28, 29A, 29B, 31A and 31B includes a respective rotor 34-38. Each of these rotors 34-38 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 34 is connected to a gear train 40, for example, through a fan shaft 42. The gear train 40 and the LPC rotor 35 are connected to and driven by the LPT rotor 38 through a low speed shaft 43. The HPC rotor 36 is connected to and driven by the HPT rotor 37 through a high speed shaft 44. The shafts 42-44 are respectively rotatably supported by a plurality of bearings 46; e.g., rolling element and/or thrust bearings. Each of these bearings 46 may be connected to the engine housing 32 by at least one stationary structure such as, for example, an annular support strut.

During operation, air enters the turbine engine 20 through the airflow inlet 24, and is directed through the fan section 28 and into a core gas path 48 and a bypass gas path 50. The air within the core gas path 48 may be referred to as "core air". The air within the bypass gas path 50 may be referred to as "bypass air". The core air is directed through the engine sections 29-31, and exits the turbine engine 20 through the airflow exhaust 26 to provide forward engine thrust. Within the combustor section 30, fuel is injected into a (e.g., annular) combustion chamber 52 and mixed with the core air. This fuel-core air mixture is ignited to power the turbine engine 20. The bypass air is directed through the bypass gas path 50 and out of the turbine engine 20 through a bypass nozzle 54 to provide additional forward engine thrust which may account for the majority of the forward engine thrust. Alternatively, at least some of the bypass air may be directed out of the turbine engine 20 through a thrust reverser to provide reverse engine thrust.

Figure 2:
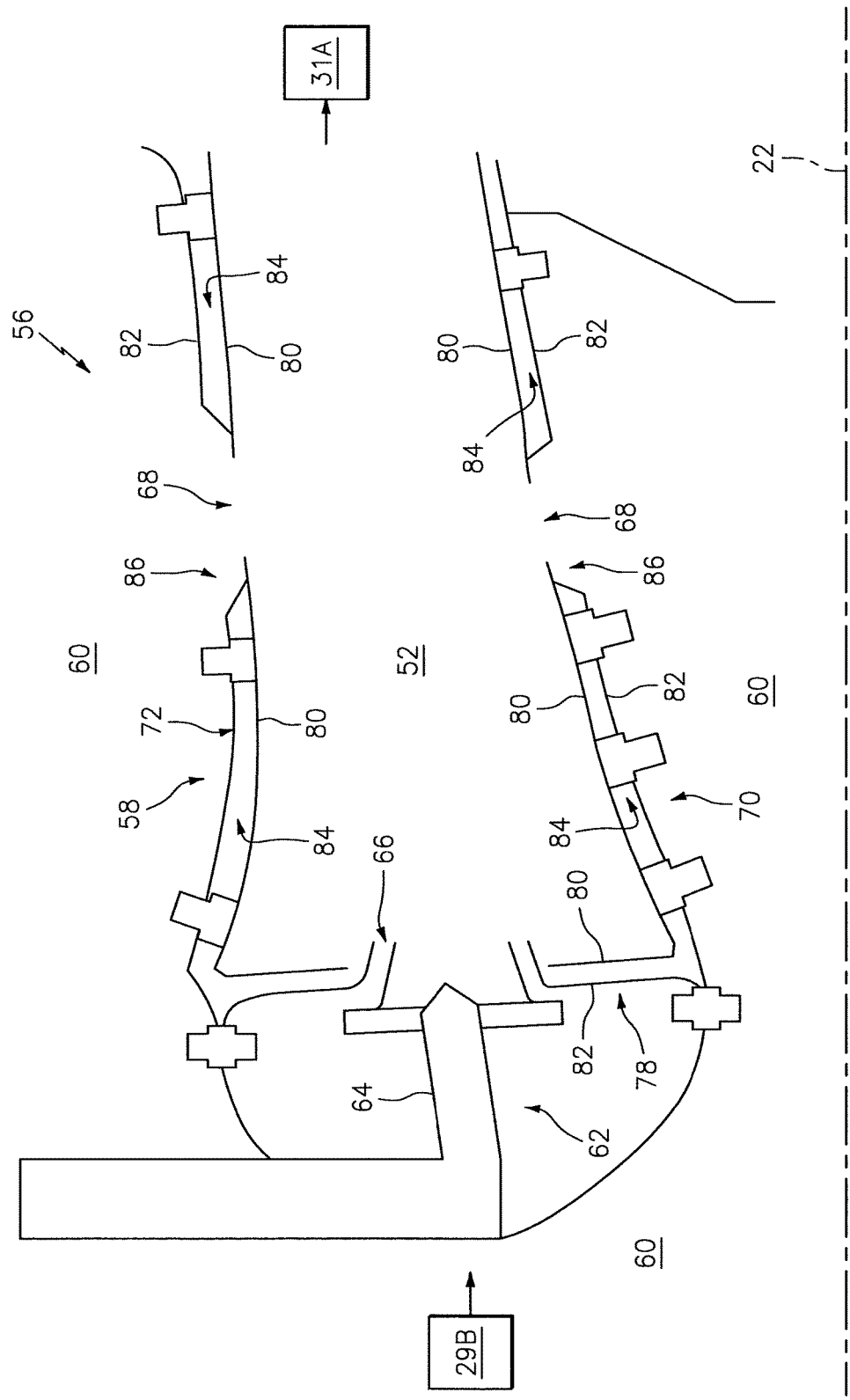
FIG. 2 is a partial sectional schematic illustration of an assembly for the turbine engine of FIG. 1.

FIG. 2 illustrates an assembly 56 of the turbine engine 20 of FIG. 1. The turbine engine assembly 56 includes a combustor 58 arranged within a (e.g., annular) combustor plenum 60 formed by a diffuser module. The plenum 60 receives compressed core air from the HPC section 29B through an inlet passage of the diffuser module. The plenum 60 provides the received core air to the combustor 58 as described below in further detail.

The turbine engine assembly 56 also includes one or more fuel injector assemblies 62 arranged circumferentially around the centerline 22. Each of these fuel injector assemblies 62 includes a fuel injector 64 that may be mated with a swirler 66. The fuel injectors 64 inject the fuel into the combustion chamber 52. The swirlers 66 direct some of the core air from the plenum 60 into the combustion chamber 52 in a manner that facilitates mixing the core air with the injected fuel. One or more igniters (not shown) ignite the fuel-core air mixture. Quench apertures 68 (see also FIG. 3) in inner and/or outer walls 70 and 72 of the combustor 58 may direct additional core air into the combustion chamber 52 for combustion. Additional core air may also be directed (e.g., effused) into the combustion chamber 52 through one or more cooling holes (e.g., see 74-76 in FIGS. 4 and 9) in the inner and the outer walls 70 and 72.

The combustor 58 may be configured as an annular floating wall combustor. The combustor 58 of FIG. 2, for example, includes an annular combustor bulkhead 78, the tubular combustor inner wall 70, and the tubular combustor outer wall 72. The bulkhead 78 extends radially between and is connected to the inner wall 70 and the outer wall 72. Each wall 70, 72 extends axially downstream and aft along the centerline 22 from the bulkhead 78 towards the HPT section 31A, thereby defining the combustion chamber 52.

Figure 4:
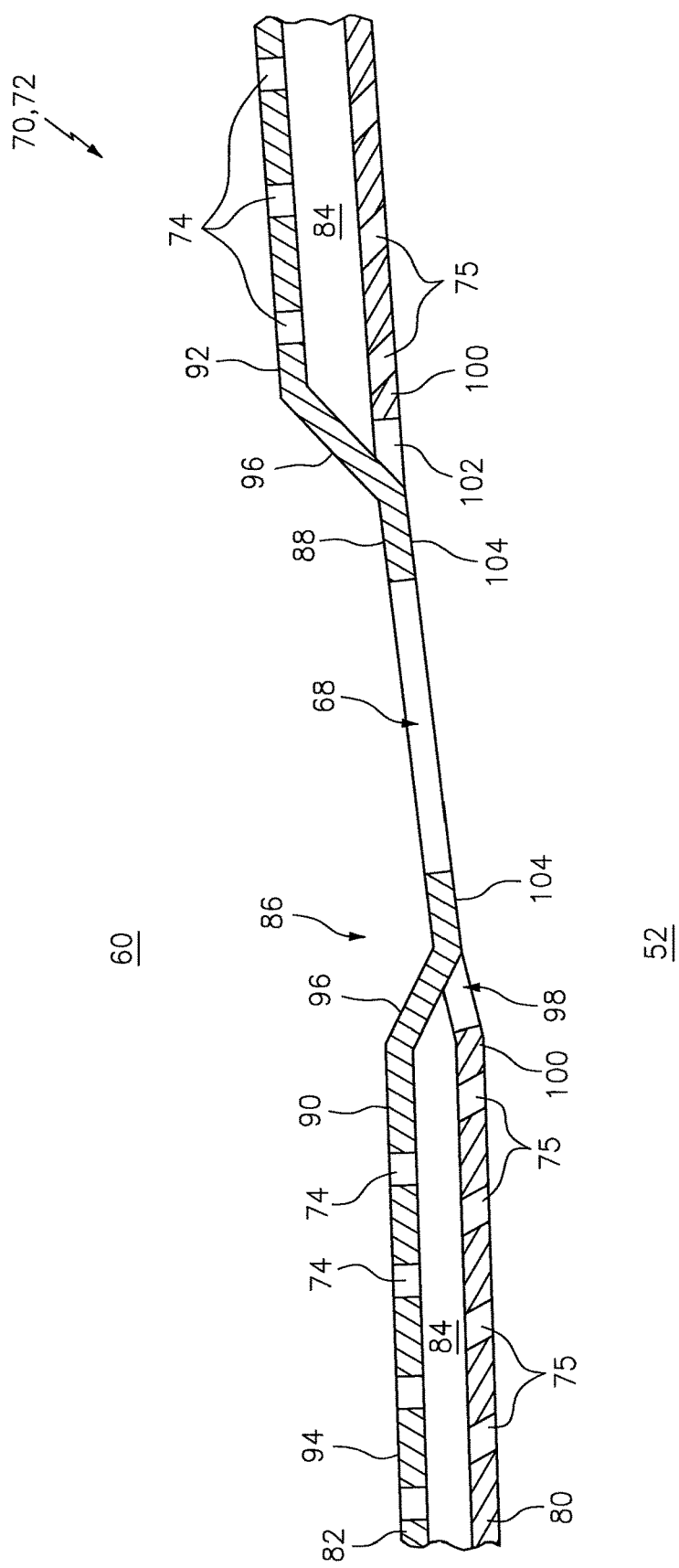
FIG. 4 is a partial sectional schematic illustration of a combustor wall for the turbine engine assembly of FIG. 2.

Each combustor component 70, 72 and 78 may be a multi-walled structure that includes, for example, an interior layer (e.g., a heat shield 80) connected with an exterior layer (e.g., a shell 82). The inner and the outer walls 70 and 72, for example, each respectively include a heat shield 80 attached (e.g., mechanically fastened and/or bonded) to a shell 82 with at least one cooling cavity 84 (e.g., impingement cavity) extending vertically (e.g., generally radially relative to the centerline 22) between the shell 82 and the heat shield 80. Referring to FIG. 4, this cooling cavity 84 may be fluidly coupled with the plenum 60 through the one or more impingement holes 74 in the shell 82. The cooling cavity 84 may be fluidly coupled with the combustion chamber 52 through the one or more effusion holes 75 (see also 76 in FIG. 9) in the heat shield 80 and/or shell 82. The shell 82 may be configured as a unitary full hoop body. The heat shield 80 may also be configured as a unitary full hoop body. The present disclosure, however, is not limited to the foregoing multi-walled structure configuration. For example, in some embodiments the shell 82 may be configured from one or more arrays of shell panels. In addition or alternatively, in some embodiments, the heat shield 80 may be configured from one or more arrays of heat shield panels.

Figure 3:
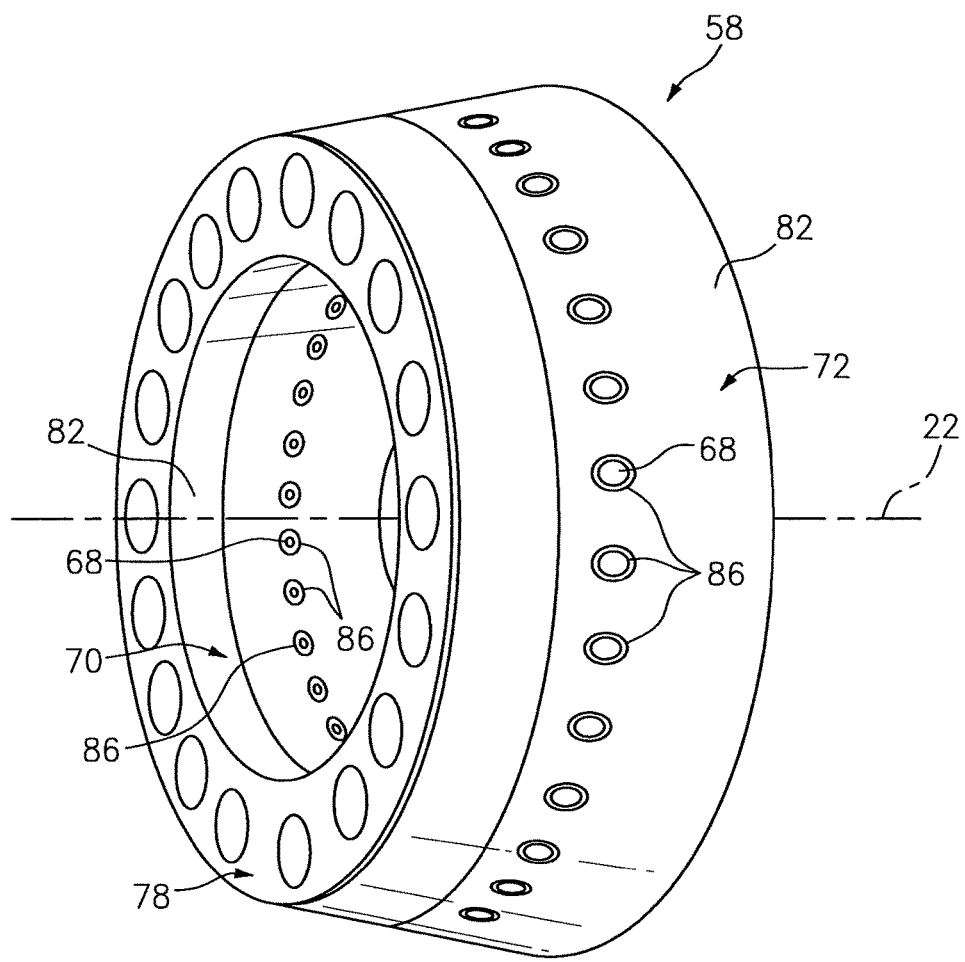
FIG. 3 is a perspective schematic illustration of a combustor for the turbine engine assembly of FIG. 2.
Figure 5:
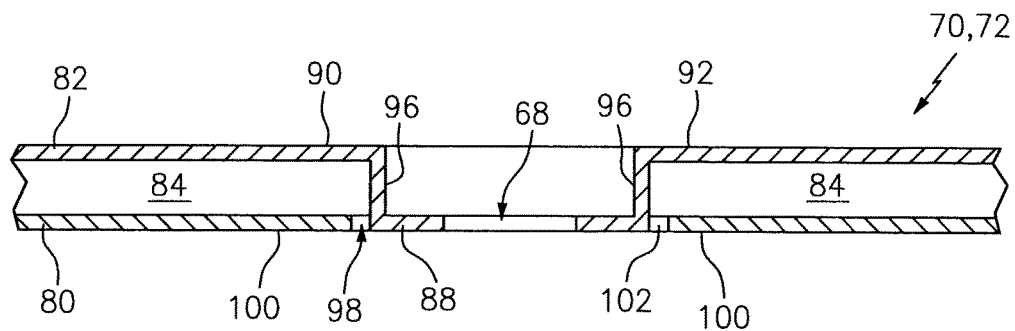
FIGS. 5-11 are partial sectional schematic illustrations of alternate combustor walls for the turbine engine assembly of FIG. 2.

Referring to FIGS. 2-4, the shell 82 of the inner and/or the outer walls 70 and 72 may include one or more vertical indentations 86; e.g., depressions and/or cupped regions. Each of these indentations 86 may be configured as a portion 88 of the shell 82 which is vertically depressed (e.g., recessed radially inward or outward) relative to one or more adjacent and/or surrounding portions 90 and 92 of the shell 82. For example, referring to FIG. 4, an exterior surface 94 (e.g., a plenum surface) of the shell 82 at (e.g., on, adjacent or proximate) the portion 88 is vertically offset from the exterior surface 94 at the adjacent portions 90 and 92. A (e.g., annular) transition 96 between the portions may be gradual (e.g., sloped) as illustrated in FIG. 4, or alternatively sharp as illustrated in FIG. 5.

Each portion 88 is configured to substantially completely (or at least partially) define a respective one of the quench apertures 68 through the combustor wall 70, 72. The portion 88 of FIG. 4, for example, extends vertically at least partially into (or through) a respective aperture 98 in the heat shield 80. In this manner, the combustor wall 70, 72 at the respective quench aperture 68 may have a single layer structure; e.g., a shell only structure. It is worth noting, such a single layer structure may significantly reduce the material lump mass proximate the quench aperture 68 as compared to prior art combustor walls which include grommets and/or other relatively thick annular bodies to define quench apertures. As a result, the combustor wall 70, 72 of the present disclosure may be subject to lower thermal stresses and fatigues than prior art combustor walls.

Figure 6:
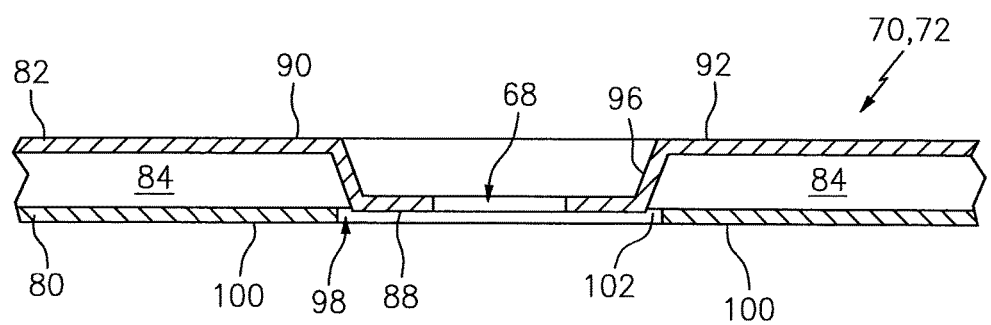
Figure 7:
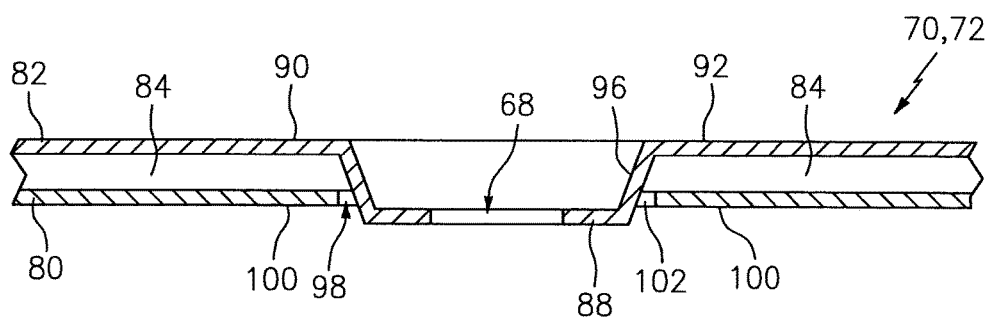

Referring again to FIG. 4, the portion 88 may be substantially vertically inline with an adjacent portion 100 of the heat shield 80 which defines the aperture 98. Alternatively, the portion 88 may be vertically recessed within the aperture 98 (see FIG. 6), or protrude vertically out from the aperture 98 into the combustion chamber 52 (see FIG. 7). With the foregoing configurations, the portion(s) 88 and the heat shield 80 together form a side periphery of the combustion chamber 52. Thus, to provide a protection between combustion gases within the combustion chamber 52 and the combustor wall 70, 72, each portion 88 and/or the heat shield 80 (or at least a portion thereof) as well as, in some embodiments, the transition(s) 96 may be coated with a coating such as, but not limited to, a thermal barrier coating. Various types of coatings and thermal barrier coatings are known in the art and the present disclosure is not limited to any particular types thereof. It is also worth noting, the coating may be relatively thin since the portions of the combustor wall 70, 72 proximate the quench aperture may be maintained relatively cool.

Figure 8:
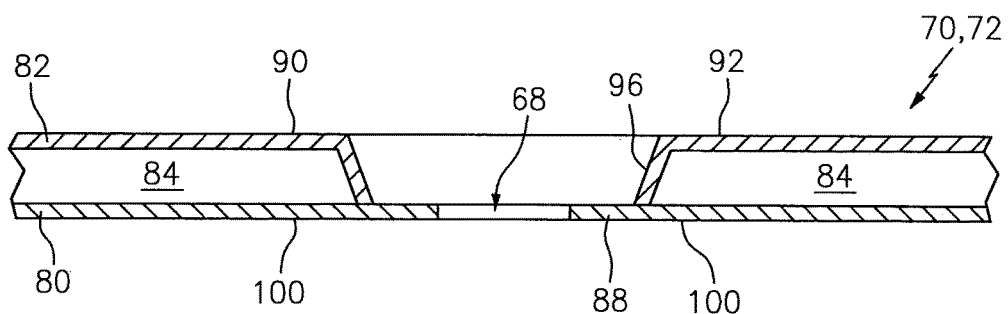

An outer peripheral geometry (e.g., size and/or shape) of the portion 88 may be similar, but slightly smaller than an inner peripheral geometry of the aperture 98. In this manner, a channel 102 (e.g., an annular cooling channel) may be formed between the portions 88 and 100. This channel 102 fluidly couples the cooling cavity 84 with the combustion chamber 52. Alternatively, referring to FIG. 8, the portions 88 and 100 may fully (or partially) engage one another to provide a substantially sealed interface between the shell 82 and the heat shield 80.

The outer peripheral geometry of the portion 88 may be curved (e.g., circular, oval, elliptical, etc.) as illustrated in FIG. 3, polygonal (e.g., square, rectangular, triangular, etc.) or any other shape. The present disclosure, of course, is not limited to any particular outer peripheral geometry shapes.

One or more of the portions 90 and 92 may each have a vertical thickness that is substantially equal to a vertical thickness of the portion 88. In such an embodiment, the shell 82 may have a substantially uniform thickness. Alternatively, one or more of the portions 90 and 92 may each have a vertical thickness that is less than or greater than a vertical thickness of the portion 88.

Each of the portions 90 and 92 may overlap and be vertically spaced/offset from the respective heat shield 80. In this manner, the portions 90 and 92 and respective vertically opposing portion(s) 100 of the heat shield 80 may form the cooling cavity 84 in the combustor wall 70, 72.

Figure 9:
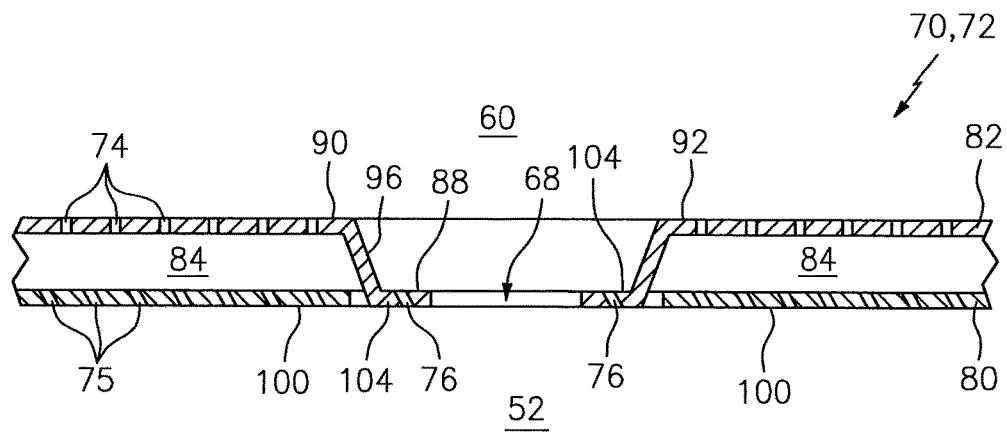

In some embodiments, as illustrated in FIG. 9, each portion 88 may include the one or more cooling holes 76; e.g., effusion apertures. These cooling holes 76 may be arranged circumferentially about the respective quench aperture 68. Each cooling hole 76 of FIG. 9 extends vertically through an annular rim 104 of the portion 88, which rim 104 forms an outer periphery of the respective quench aperture 68. It is worth noting, the cooling holes 76 receive cooling air from the plenum 60 opposed to the cooling holes 75 which receive cooling air from the cavity 84. As a result, each portion 88 of the shell 82 can receive a higher degree of film cooling than the adjacent portion(s) 100 of the heat shield 80.

Figure 10:
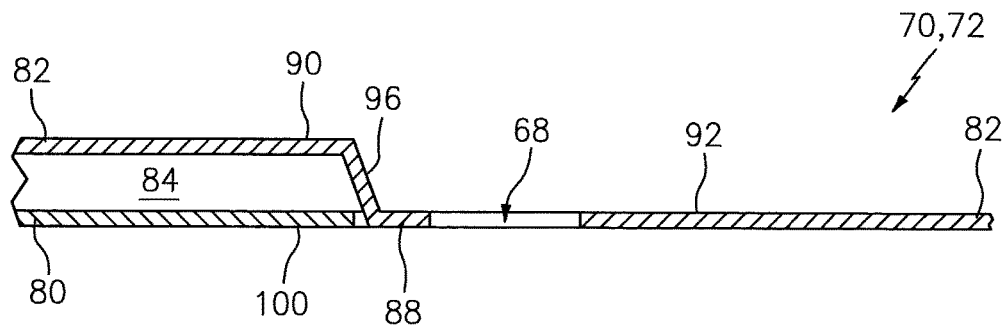
Figure 11:
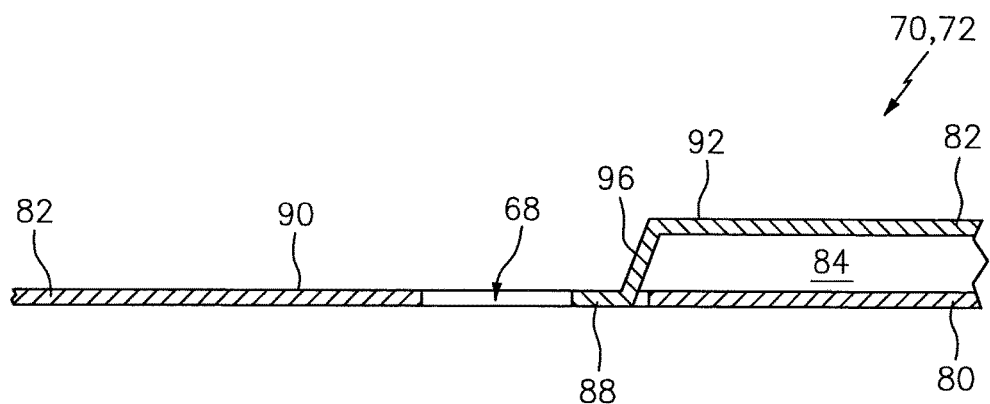

In some embodiments, as illustrated in FIG. 10, the heat shield 80 of the combustor wall 70, 72 may be configured forward of the portions 88 and the quench apertures 68. In such embodiments, the portions 88 and 92 may be configured together as a single portion that extends to an aft, downstream distal end of the combustor wall 70, 72. In other embodiments however, as illustrated in FIG. 11, the heat shield 80 of the combustor wall 70, 72 may be configured aft of the portions 88 and the quench apertures 68. In such embodiments, the portions 88 and 90 may be configured together as a single portion that extends to a forward, upstream distal end of the combustor wall 70, 72.

Figure 12:
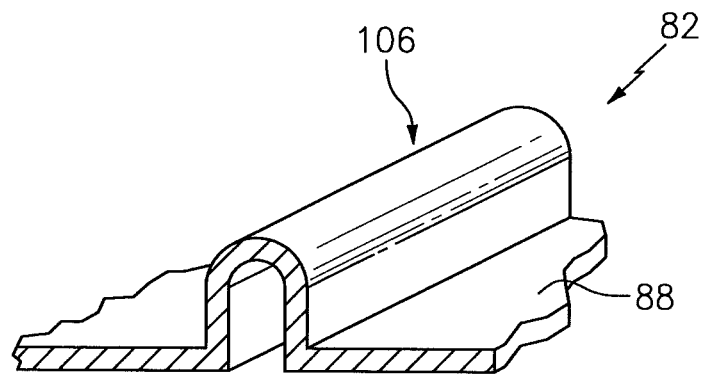
FIGS. 12 and 13 are partial perspective illustrations of a portion of a combustor wall with alternative stiffening and/or heat transfer features.
Figure 13:
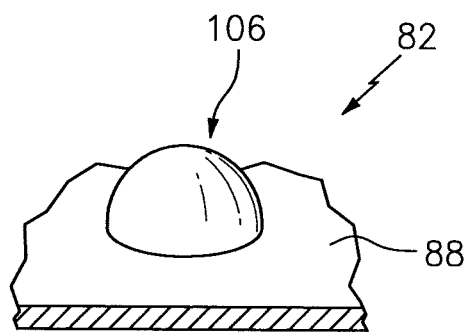

In some embodiments, as illustrated in FIGS. 12 and 13, one or more of the portions 88 (or any other portion of the shell 82 and/or heat shield 80) may each be configured with one or more stiffening and/or heat transfer features 106. Examples of a stiffening and/or heat transfer feature 106 include, but are not limited to, a rib/channel (see FIG. 12), a point protrusion (see FIG. 13), a dimple and/or any other type of projection and/or recession. Such features 106 may be configured to increase the structural rigidity of the portion(s) 88. Such features 106 may also or alternatively be configured to increase convective heat transfer between the shell 82 and the gas within the plenum 60.

In some embodiments, the combustor wall 70, 72 may include one or more rails. These rails may be configured with (e.g., included with or attached to) the shell 82 and/or the heat shield 80. Each rail may extend vertically between the shell 82 and the heat shield 80 and thereby sub-divide the cooling cavity 84 into a plurality of cooling cavities. For example, one or more of the rails may be aligned with one or more of the portions 88 such that each portion 88 is between and adjacent two or more different cavities.

In some embodiments, one or more of the combustor walls 70 and 72 may also be configured with one or more traditional quench apertures; e.g., quench apertures formed by quench aperture grommets. For example, the combustor wall 70, 72 may be configured with a mixture of alternating traditional quench apertures and quench apertures 68 formed as described above. In other embodiments, one of the combustor walls 70, 72 may be configured as described above while the other one of the combustor walls 72, 70 may have a more traditional configuration; e.g., quench apertures formed by quench aperture grommets.

The turbine engine assembly 56 may be included in various turbine engines other than the one described above. The turbine engine assembly 56, for example, may be included in a geared turbine engine where a gear train connects one or more shafts to one or more rotors in a fan section, a compressor section and/or any other engine section. Alternatively, the turbine engine assembly 56 may be included in a turbine engine configured without a gear train. The turbine engine assembly 56 may be included in a geared or non-geared turbine engine configured with a single spool, with two spools (e.g., see FIG. 1), or with more than two spools. The turbine engine may be configured as a turbofan engine, a turbojet engine, a propfan engine, or any other type of turbine engine. The present invention therefore is not limited to any particular types or configurations of turbine engines.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for a turbine engine, comprising:
   a combustor wall including a first layer vertically connected with a second layer;
   a first portion of the first layer overlapping and vertically spaced from the second layer by a cavity; and
   a second portion of the first layer vertically inline with an adjacent portion of the second layer, and at least partially forming a quench aperture vertically through the combustor wall;

wherein a vertical thickness of the first portion is equal to a vertical thickness of the second portion; and wherein the combustor wall extends circumferentially about and axially along a centerline, and the first portion is located axially forward of the second portion.

2. The assembly of claim 1, wherein the second portion completely defines the quench aperture vertically through the combustor wall.

3. The assembly of claim 1, wherein the second portion extends partially vertically into an aperture in the second layer.

4. The assembly of claim 1, wherein the second portion forms a vertical indentation in the first layer.

5. The assembly of claim 1, wherein at least the second portion of the first layer and the second layer are configured to form a side periphery of a combustion chamber.

6. The assembly of claim 5, wherein at least a portion of the first layer at the side periphery is coated with a thermal barrier coating and/or at least a portion of the second layer at the side periphery is coated with a thermal barrier coating.

7. The assembly of claim 1, wherein the second portion has a curved geometry.

8. The assembly of claim 1, wherein the second portion includes one or more cooling holes.

9. The assembly of claim 1, wherein the second portion includes one or more stiffening features.

10. The assembly of claim 1, wherein the second portion includes one or more protrusions.

11. The assembly of claim 1, wherein the first layer comprises a shell and the second layer comprises a heat shield.

12. An assembly for a turbine engine, comprising:
a combustor wall including a first layer vertically connected with a second layer;
a first portion of the first layer overlapping and vertically spaced from the second layer by a cavity; and
a second portion of the first layer vertically inline with an adjacent portion of the second layer, and at least partially forming a quench aperture vertically through the combustor wall;
wherein a vertical thickness of the first portion is equal to a vertical thickness of the second portion; and
wherein the combustor wall extends circumferentially about and axially along a centerline, and the first portion is located axially aft of the second portion.

13. An assembly for a turbine engine, comprising:
a combustor wall including a first layer vertically connected with a second layer;
a first portion of the first layer overlapping and vertically spaced from the second layer by a cavity; and
a second portion of the first layer vertically inline with an adjacent portion of the second layer, and at least partially forming a quench aperture vertically through the combustor wall;
wherein a vertical thickness of the first portion is equal to a vertical thickness of the second portion; and
wherein a third portion of the first layer overlaps and is vertically spaced from the second layer by the cavity or another cavity, and the second portion is between the first portion and the third portion.

* * * * *